(12) United States Patent
Nishida (10) Patent No.: US 8,120,732 B2
(45) Date of Patent: Feb. 21, 2012

(54) LIQUID CRYSTAL DISPLAY DEVICE WITH DIFFERENT LIQUID CRYSTAL LAYER THICKNESSES CORRESPONDING TO DIFFERENT COLOR REGIONS

(75) Inventor: Shinichi Nishida, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 238 days.

(21) Appl. No.: 11/456,967

(22) Filed: Jul. 12, 2006

(65) Prior Publication Data

US 2007/0013832 A1 Jan. 18, 2007

(30) Foreign Application Priority Data

Jul. 13, 2005 (JP) ................................. 2005-204519

(51) Int. Cl.
*G02F 1/1335* (2006.01)
*G02F 1/1343* (2006.01)
(52) U.S. Cl. ......... 349/107; 349/106; 349/108; 349/141
(58) Field of Classification Search .................. 349/141, 349/106–109
See application file for complete search history.

(56) References Cited

U.S. PATENT DOCUMENTS

| | | | |
|---|---|---|---|
| 6,037,084 A * | 3/2000 | Ting et al. | 430/7 |
| 6,583,839 B2 | 6/2003 | Suzuki et al. | 349/141 |
| 6,646,707 B2 | 11/2003 | Noh et al. | |
| 6,661,484 B1 * | 12/2003 | Iwai et al. | 349/107 |
| 6,842,207 B2 | 1/2005 | Nishida et al. | |
| 6,862,067 B2 | 3/2005 | Matsumoto et al. | 349/141 |
| 7,002,647 B2 | 2/2006 | Tanaka | 349/107 |
| 2001/0010574 A1 * | 8/2001 | Hiroshi | 349/141 |
| 2002/0030780 A1 * | 3/2002 | Nishida et al. | 349/141 |
| 2004/0027503 A1 * | 2/2004 | Tanaka | 349/43 |
| 2004/0189913 A1 * | 9/2004 | Kim et al. | 349/128 |
| 2005/0122460 A1 * | 6/2005 | Yokogawa et al. | 349/141 |

FOREIGN PATENT DOCUMENTS

| | | |
|---|---|---|
| CN | 1181218 | 5/1998 |
| CN | 1359026 | 7/2002 |
| JP | 09-080415 | 3/1997 |
| JP | 10-133190 | 5/1998 |
| JP | 2828073 | 9/1998 |
| JP | 10307295 A * | 11/1998 |
| JP | 3120751 | 10/2000 |
| JP | 2002196369 | 7/2002 |
| JP | 2002-229062 | 8/2002 |
| JP | 2003-050388 | 2/2003 |
| TW | 583419 | 4/2004 |
| TW | 594335 | 6/2004 |

OTHER PUBLICATIONS

Taiwanese Official Action dated Mar. 24, 2010.
Japanese Official Action dated Nov. 2, 2010.
Japanese Official Action dated Feb. 8, 2011.

* cited by examiner

*Primary Examiner* — Jessica M Merlin
(74) *Attorney, Agent, or Firm* — Hayes Soloway P.C.

(57) ABSTRACT

A full-color lateral-electric-field LCD device has an organic transparent film having three different thicknesses for the pixels having RGB colors. The thicknesses $d_R$, $d_G$, $d_B$ of the organic transparent film and the representative wavelengths $\lambda_R$, $\lambda_G$ and $\lambda_B$ of the color filters satisfy the following relationship:

$$d_R : d_G : d_B \approx \lambda_R : \lambda_G : \lambda_B.$$

The different thicknesses provide different thicknesses for the LC layer, to improve the image quality of the LCD device in a slanted viewing direction.

10 Claims, 8 Drawing Sheets

LIQUID CRYSTAL DISPLAY DEVICE WITH DIFFERENT LIQUID CRYSTAL LAYER THICKNESSES CORRESPONDING TO DIFFERENT COLOR REGIONS

BACKGROUND OF THE INVENTION (a) Field of the Invention

The present invention relates to a liquid crystal display (LCD) device and, more particularly, to a lateral-electric-field-mode LCD device such as an in-plane-switching-mode (IPS-mode) LCD device.

(b) Description of the Related Art

LCD devices are categorized in two types: a first type wherein orientation of a liquid crystal (LC) layer in the LCD device is rotated in a plane normal to the surface (substrate surface) of the substrates sandwiching therebetween the LC layer; and a second type wherein the orientation of the LC layer is rotated in a plane parallel to the substrate surface. The first type includes a twisted-nematic-mode (TN-mode) LCD device as a typical example, whereas the second type includes an IPS-mode LCD device as a typical example.

In the TN-mode LCD device, since the LC layer has an orientation deviated from a plane parallel to the substrate surface, a larger viewing angle may cause a larger deviation in the polarization angle of the transmitted light. As a result, it narrows down the viewing angle. On the other hand, in the IPS-mode LCD device, since the LC layer has an orientation in a plane parallel to the substrate surface, a higher viewing angle does not cause a deviation in the polarization direction, thereby achieving a wider viewing angle characteristic. This leads to a recent tendency for employment of a larger number of lateral-electric-field-mode (LEF-mode) LCD devices. However, although the LEF-mode LCD device thus achieves a wider viewing angle characteristic in comparison with the TN-mode LCD device, it is known that the LEF-mode LCD device involves a problem of coloring or color deviation in a larger degree as observed in a slanted viewing direction.

In general, LCD devices are designed to achieve an almost uniform optical intensity for the RGB primary-color components of the light transmitted by the LC layer in the direction normal to the substrate surface. However, if the angle of the incident light (incident angle) is deviated from the direction normal to the substrate surface, retardation for the LC layer changes and thus the optical intensity of the transmitted light changes.

The retardation is determined by a product of the optical path length by the refractive index anisotropy, and does not depend on the wavelength of the transmitted light. However, the optical intensity of the RGB components of the transmitted light changes independently of each other, because the optical intensity of the transmitted light changes depending on the ratio of the retardation to the wavelength of the transmitted light, thereby causing a significant range of variation in the optical intensity among the RGB components of the transmitted light. Thus, the image observed in the slanted viewing direction involves a coloring, wherein one or two of the RGB components of the transmitted light are intensified to change the original color image. The coloring thus degrades the image quality of the original picture.

Patent Publication JP-3120751B describes a LCD device wherein each pixel includes two sub-pixel areas having different directions of the electric field applied to the LC layer, More specifically, the orientation of the LC layer is rotated by the different directions of the electric field in is the opposite rotational directions between the sub-pixel areas while keeping the symmetric relationship in the orientations between the sub-pixel areas. It is recited in the publication that this configuration compensates the optical characteristics of both the sub-pixel areas therebetween to suppress the coloring.

In the configuration of the above publication, the coloring is suppressed only when the gray-scale level represents a bright state, wherein the orientations of the LC layer in both the sub-pixel areas are perpendicular to one another. If the gray-scale level represents a dark state or an intermediate state wherein the angle in the orientations of the LC layer between both the sub-pixel areas is deviated from the 90 degrees, the compensation of the optical characteristics is insufficient, whereby the coloring is not suppressed in a desired degree.

Figure 8:
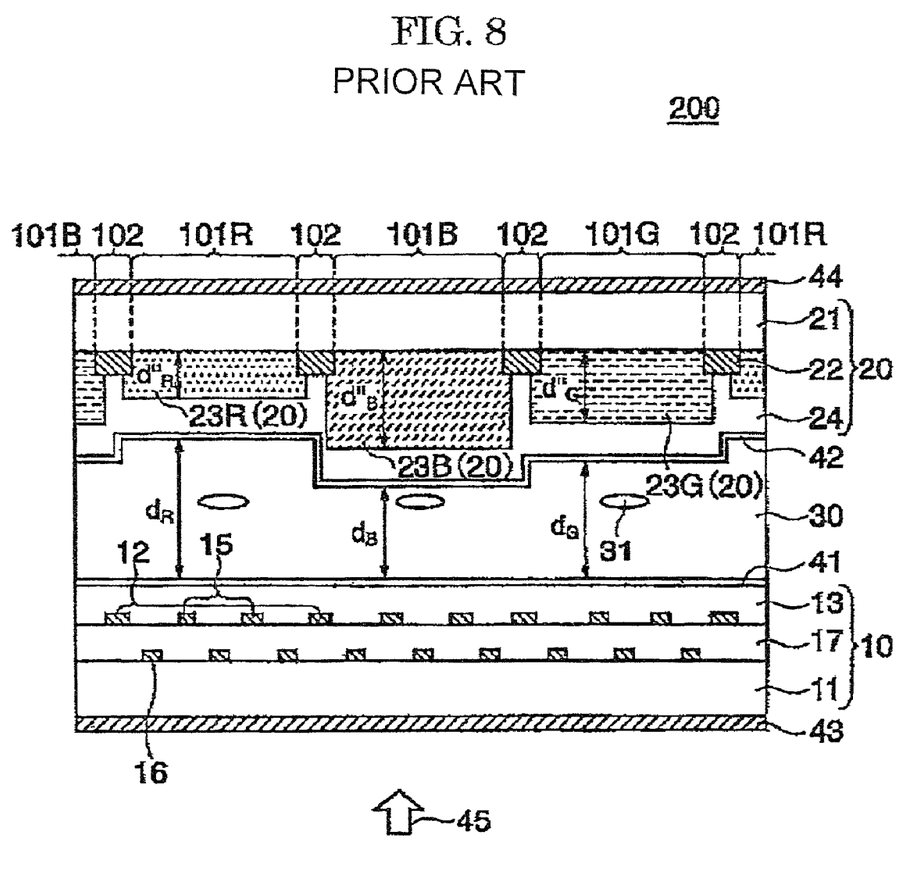
FIG. 8 is a sectional view of a conventional LCD device described in a publication

FIG. 8 shows the LCD device described in Patent Publication JP-2828073B, which describes a technique for providing different thicknesses for the color filters of the RGB pixels in the LCD device. In FIG. 8, RGB pixels 101R, 101G and 101B include color filters 23R, 23G and 23B having different thicknesses $d''_R$, $d''_G$ and $d''_B$, whereby the LC layer 30 has different thicknesses $d_R$, $d_G$ and $d_B$ in the RGB pixels 101R, 101G and 101B, respectively. The ratio $d_R:d_G:d_B$ in the LC layer 30 is set equal to the ratio $\lambda_R:\lambda_G:\lambda_B$, wherein given $\lambda_R$, $\lambda_G$ and $\lambda_B$ are the representative wavelengths of the color filters for the respective RGB pixels. The representative wavelengths are each selected from within the wavelength range having 70% of the peak wavelength in the spectrum of the light passed by the respective color filters 23R, 23G and 23B of the RGB pixels.

In the LCD device described in JP-2828073B and having different thicknesses of the RGB color filters, the configuration wherein $d_R:d_G:d_B=\lambda_R:\lambda_G:\lambda_B$ allows the ratio of the retardation to the wavelength to have a substantially same value among the RGB pixels, independently of the incident angle with respect to the substrate surface. This suppresses the range of variation in the optical intensity among the RGB components of the transmitted light, to thereby suppress the coloring in the image as observed in a slanted viewing direction.

In the LCD device described in JP-2828073B, it should be noted that the color filters 23R, 23G and 23B having different thicknesses must have the same chromaticity for the RGB components of the transmitted light irrespective of the different thicknesses. Thus, the pigments mixed in the respective color filters must be adjusted in consideration of the thicknesses of the respective color filters to achieve the same chromaticity for the RGB components.

This adjustment of the pigments necessitates a variety of design works including calculation of the absorbed spectrum, determination of the concentration of the pigments, viscosity of the pigment paste, measurement of the chromaticity for the RGB components achieved, and correction of the chromaticity based on the measurement. That is, the adjustment of the pigment necessitates complicated design work and may raise the costs of the LCD device.

SUMMARY OF THE INVENTION

In view of the above problems in the conventional technique, it is an object of the present invention to provide a LCD device which, is capable of suppressing the coloring in the image as observed in a slanted viewing direction irrespective of the gray-scale levels and which does not necessitate complicated design work.

The present invention provides a liquid crystal display (LCD) device including a liquid crystal (LC) layer, and a TFT substrate and a color-filter substrate sandwiching therebetween the LC layer, the LC layer being driven by the TFT substrate in a lateral-electric-field mode and defining an array of pixels, the color-filter substrate mounting thereon first through third primary-color filters defining first through third primary colors for the respective pixels, wherein: the TFT substrate has three different thicknesses corresponding to the first through third primary colors of the pixels; and a relationship among the three different thicknesses is such that one of the three different thicknesses corresponding to the first primary color having a longest wavelength is smaller than another of the three different thicknesses corresponding to the second primary color having an intermediate wavelength, and the another of the three different thicknesses is smaller than the other of the three different thicknesses corresponding to the third primary color having a shortest wavelength.

The present invention also provides a method for fabricating a liquid crystal display (LCD) device including a liquid crystal (LC) layers and a TFT substrate and a color-filter substrate sandwiching therebetween the LC layer, the LC layer being driven by the TFT substrate in a lateral-electric-field mode and defining an array of pixels, the color-filter substrate mounting thereon first through third primary-color filters defining first through third primary colors for the respective pixels. The method includes the steps of forming a transparent film having a uniform thickness on one of the TFT substrate and the color-filter substrate; exposing the transparent film to exposure light through a mask having different optical transmission factors corresponding to the primary colors; and developing the exposed transparent film to have different thickness in different areas corresponding to each of the primary colors.

In an alternative, the exposing step may be such that the transparent film is exposed through a mask to exposure light having different optical intensities corresponding to the primary colors.

In accordance with the present invention, the transparent film having different thicknesses corresponding to three-primary colors of the pixels provides different thicknesses of the LC layer in the respective pixels having different primary colors, thereby suppressing the coloring of the LC layer without involving complicated design works.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings, wherein similar constituent elements are designated by similar reference numerals throughout the drawings.

Figure 1:
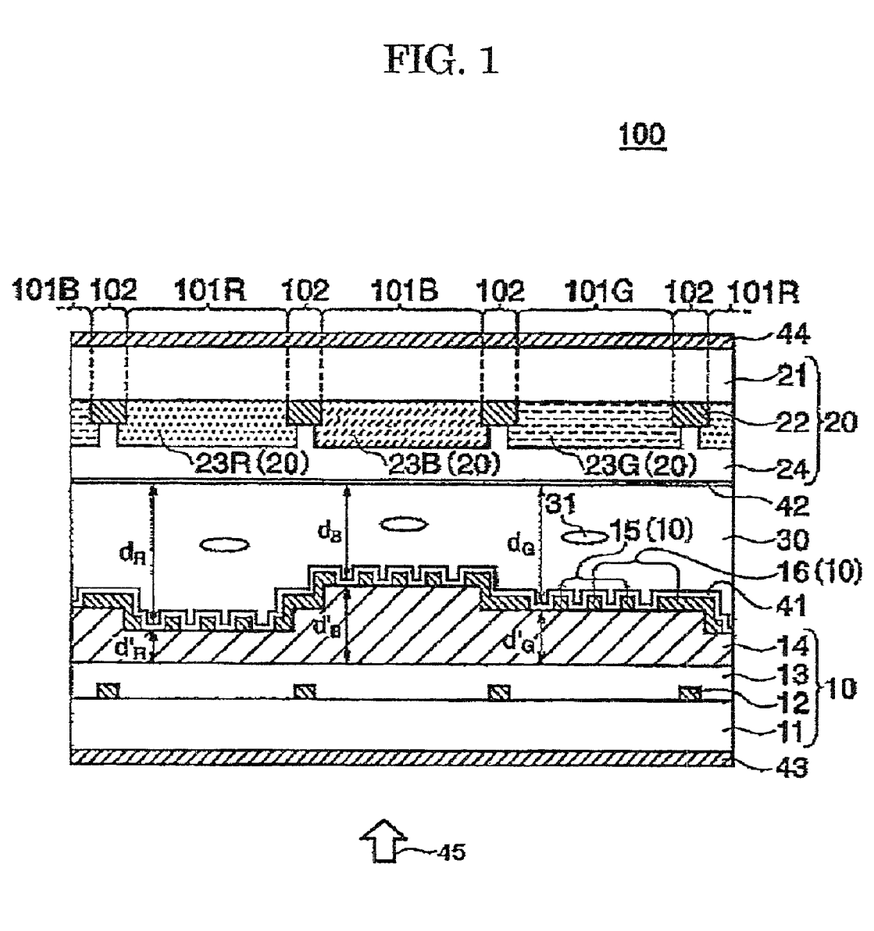
FIG. 1 is a sectional view of a LCD device according to a first embodiment of the present invention.

FIG. 1 shows a LCD device according to a first embodiment of the present invention. The LCD device, generally designated by numeral 100, is an active-matrix full-color transmissive LCD device, is disposed in front of a backlight source emitting a white light 45, and an array of RGB pixels which respectively pass therethrough RGB components of the incident light by using the light switching function of the pixels.

The LCD device 100 includes a LC layer 30, a TFT substrate 10 disposed in the rear side or light-incident side of the LC layer 30, and a color-filter substrate 20 disposed in the front side or light-emitting of the LC layer 30. The TFT substrate 10 includes an array of pixels 101 including RGB pixels 101R, 101G, 101B in a group, and an array of thin-film-transistors (TFTs, not shown in the figure) each associated with a corresponding one of the pixels 101. The color-filter substrate 20 mounts thereon color filters 23R, 23G, 23B corresponding to the RGB pixels 101R, 101G, 101B. The pixels 101 in the array form a plurality of groups each including RGB pixels 101R, 101G and 101B. Each pixel 101 is encircled by a corresponding portion of a light-shield area 102.

The TFT substrate 10 includes a glass substrate body 11, which mounts thereon a plurality of scanning lines (not shown), a plurality of common lines (not shown) and a silicon nitride film (not shown) covering the scanning lines and common lines. On the silicon nitride film, a plurality of data lines 12 extend for each column of the pixels 101. The scanning lines, common lines and data lines 12 extend in the area (masked area) covered by the light-shield mask 102 of the TFT substrate 100. A passivation film 13 made of silicon nitride covers the data lines 12 on the silicon nitride film. The passivation film 13 has a function of protecting the scanning lines, common lines, data lines 12 etc.

On the passivation film 13 is formed an organic transparent film 14 such as made of acrylic resin, on which a pixel electrode 15 and a common electrode 16 made of a transparent conductor are formed in each pixel 101. The LCD device 100 controls the voltage between the pixel electrode 15 and the common electrode 16 to generate a lateral electric field, which is applied to respective portions of the LC layer 30. The common electrode 16 has a width larger than the width of the data lines 12, and overlaps the data lines 12 for shielding the electric field generated by the data lines 12. The organic transparent film 14 has a relatively large thickness sufficient for reducing the parasitic capacitance formed between the data lines 12 and common electrode 16.

The color-filter substrate 20 includes a glass substrate body 21, on which a black matrix 22 is formed to configure the light-shield area 102 for encircling and separating the pixels 101. Color filters 23R, 23G, 23B are formed on the glass substrate body 21 exposed from the black matrix 22 and on part of the black matrix 22. An overcoat film 24 covers the color filters 22R, 22G, 22B.

An orientation film 41 covers the surface of the TFT substrate 10 in contact with the LC layer 30. A plurality of columnar spacers (not shown) are formed on the surface of the color-filter substrate 20 in contact with the LC layer 30, in the light-shield area 102 near the B-pixels 101B. An orientation film 42 covers the color-filter substrate 20 including the columnar spacers. The top end of the columnar spacers contacts the surface of the TFT substrate 10 to define a constant gap between the TFT substrate 10 and the color-filter substrate 20. The orientation films 41, 42 are rubbed beforehand in the directions parallel to one another.

A white light 45 is incident onto the LCD device 100 for operating the LCD device 100 in a transmissive mode. Polarization films 43 and 44 are formed on the light-incident surface of the TFT substrate 10 and the light-emitting surface of the color-filter substrate 20, respectively, and are disposed in cross nicole to one another. The polarization film 43 on the TFT substrate 10 has an absorption axis aligned with the initial orientation of the LC layer 30.

In the LCD device 100 of the present embodiment, as to the thicknesses $d_R$, $d_G$ and $d_B$ of the LC layer 30 in the RGB pixels 101R, 101G and 101B and the representative wavelengths $\lambda_R$, $\lambda_G$, $\lambda_B$ of the RGB color filters 23R, 23G, 23B, the following relationship holds:

$$d_R:d_G:d_B=\lambda_R:\lambda_G:\lambda_B.$$

The representative wavelengths $\lambda_R$, $\lambda_G$, $\lambda_B$ of the color filters 23R, 23G, 23B are selected each from within the wavelength range having a wavelength of 70% or above of the wavelength of the corresponding component of the light transmitted by the color filters 23R, 23G, 23B. In addition, in the RGB pixels 101R, 101G, 101B, the sum of the thickness $d_R$, $d_G$, $d_B$ of the LC layer 30 and the thickness of $d_R'$, $d_G'$, $d_B'$ of the organic transparent film 14 is a constant, whereby the following relationship holds:

$$d_R'<d_G'<d_B'.$$

In one example of the above embodiment, the representative wavelengths $\lambda_R$, $\lambda_G$, $\lambda_B$ of the RGB color filters 23R, 23G, 23B are determined such that $\lambda_R$=610 nm, $\lambda_G$=550 nm, $\lambda_B$=460 nm. Based on the ratio $\lambda_R:\lambda_G:\lambda_B$, the thicknesses of the LC layer 30 in the RGB pixels are determined so that $d_R$=3.3 μm, $d_G$=3.0 μm and $d_B$=2.5 μm, based on which the thicknesses $d_R'$, $d_G'$ and $d_B'$ of the organic transparent film 14 are determined so that $d_R'$=1.2 μm, $d_G'$=1.5 μm and $d_B'$=2.0 μm in the RGB pixels.

The LC layer 30 in the present embodiment includes a LC material having a refractive index anisotropy (Δn) of 0.100 and a dielectric index anisotropy (Δε) of 10. The organic transparent film 14 formed in the light-shield area 102 has a thickness, for example, equal to the thickness $d_G'$ of the organic transparent film 14 in the G-pixels 101G.

Figure 2:
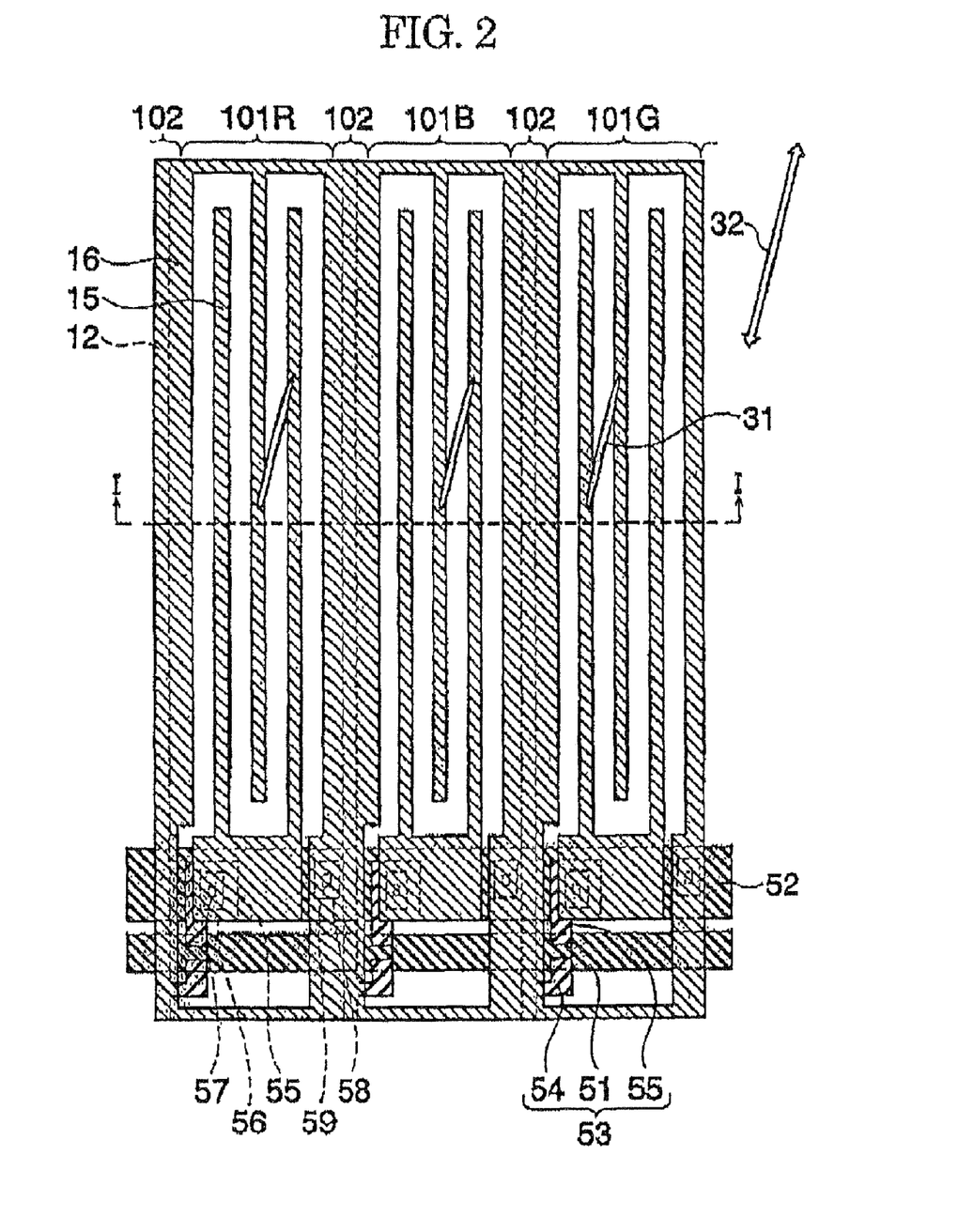
FIG. 2 is a top plan view of the TFT substrate shown in FIG. 1.

FIG. 2 shows the TFT substrate 10 together with the initial orientation of the LC layer 30 in FIG. 1, which corresponds to a sectional view taken along line I-I in FIG. 2. Each scanning line 51 and each common line 52 extend along the row direction of the pixels 101 between two adjacent rows of the pixels 101. Each data line 12 extends along the column direction of the pixels 101 between two adjacent columns of the pixels 101.

In the vicinity of an intersection between each scanning line 51 and each data line 12, there is provided a TFT 53 for driving a corresponding pixel 101. The TFT 53 includes a source electrode 54, a drain electrode 55 and a gate electrode configured by part of a scanning line 51. The source electrode 54 is connected directly to the data line 12, whereas the drain electrode 55 is connected to the overlying pixel electrode 15 via a plug filling the through-holes 56, 57 formed in the organic transparent film 14 and passivation film 13, respectively.

The common line 52 is connected to the overlying common electrode 16 via a plug filling the through-holes 58, 59 formed in the organic transparent film 14 and passivation film 13, respectively. The pixel electrode 15 and common electrode 16 are of a comb-teeth shape, wherein the teeth of the pixel electrode 15 extend in the column direction of the pixels parallel to and alternately with the teeth of the common electrode 16.

Both the orientation films 41 and 42 have a rubbing direction 32, with which the initial orientation of LC molecules 31 in the LC layer 30 is aligned. The rubbing direction 32 is 5 to 25 degrees deviated from the direction in which the comb-teeth of the pixel electrode 15 and common electrode 16 extend.

In absence of the applied voltage between the pixel electrode 15 and the common electrode 16, the LC molecules 31 in the LC layer 30 have an orientation parallel to the absorption axis of the polarization film 41 on the TFT substrate 10, whereby the light incident onto and passed by the TFT substrate 10 cannot pass through the color-filter substrate 20.

Upon presence of the applied voltage between the pixel electrode 15 and the common electrode 16 due to the turn-ON of the TFT 53, the LC layer 30 is applied with a lateral electric field, whereby the LC molecules 31 are rotated in a plane parallel to the substrate surface. The light incident onto and passed by the TFT substrate 10 passes through the LC layer 30, and also passes through the color-filter substrate 20 due to the birefringence of the LC layer 30. Control of the applied voltage controls the rotational angle of the LC molecules 31, and thus controls the optical intensity of the transmitted light.

In the LCD device of the present embodiment, due to the equality $d_R:d_G:d_B=\lambda_R:\lambda_G:\lambda_B$, the ratio of the retardation of the LC layer 30 to the wavelength is maintained substantially at a constant for the RGB components of the transmitted light, irrespective of the incident angle with respect to the substrate surface. Thus, the optical intensity is changed in a uniform amount among the RGB components depending on the incident angle with respect to the substrate surface, thereby suppressing the coloring or color change of the image as observed in a slanted viewing angle. The suppression of the coloring in the full-color RGB LCD device 100 improves the image quality of the LCD device and reproduces the original picture while representing the subtle shades of color.

In the LCD device of the present embodiment, the inequality $d_R'<d_G'<d_B'$ employed between the thicknesses of the organic transparent film 14 based on the above equality, allows the color filters 23R, 23G, 23B to have a uniform thickness. Thus, the control of the concentration of the pigments is not needed to obviate the complicated design for employing the different thicknesses of the color filters 23R, 23G, 23B.

In the LCD device 100 of the present embodiment, the obviation of the control of the pigment concentration allows a design change in the thickness of the LC layer 30 to be employed with ease. For example, if the thickness of the LC layer 10 in the G-pixel used as a reference thickness is changed to 4 μm or 2 μm, the thicknesses of the organic transparent film 14 are determined with ease without additional design works.

The representative wavelengths $\lambda_R$, $\lambda_G$, $\lambda_B$ of the color filters 23R, 23G, 23B are not limited to 610 nm, 550 nm, 460 nm as recited in the above embodiment, and may be selected as desired so long as the selected representative wavelengths have a wavelength 70% or longer of the peak wavelength of the light passed by the respective color filters. The thicknesses $d_R$, $d_G$, $d_B$ of the LC layer 30 are not limited to the above values employed in the embodiment, and may be selected as desired so long as the ratio therebetween corresponds to the ratio between the representative wavelengths. The ratio among the thicknesses $d_R$, $d_G$, $d_B$ of the LC layer 30 need not be equal to the ratio between the wavelengths $\lambda_R$, $\lambda_G$, $\lambda_B$, and a configuration wherein $d_R > d_G > d_B$ may be employed, to obtain the advantage of the present invention to some extent.

Now, a method for manufacturing the LCD device 100 of FIG. 1 will be described hereinafter. A glass substrate body 11 is first prepared, and a metallic film is deposited thereon by sputtering. The metallic film is then patterned using a known photolithographic and etching technique, to form scanning lines and common lines. The metallic film may be made of chrome, for example.

Thereafter, a plasma-enhanced chemical vapor deposition (PECVD) technique is used for consecutively depositing a 400-nm-thick silicon nitride film, a 200-nm-thick undoped amorphous silicon film, and a 30-nm-thick n-type amorphous silicon film. A dry-etching process is then conducted to pattern the undoped amorphous silicon film and n-type amorphous silicon film, thereby forming data lines 12. A 200-nm-thick passivation film 13 is then deposited on the data lines 12 and silicon nitride film, followed by forming a photosensitive acrylic resin film 14 having a uniform thickness on the passivation film 13 by using a coating technique.

Figure 3:
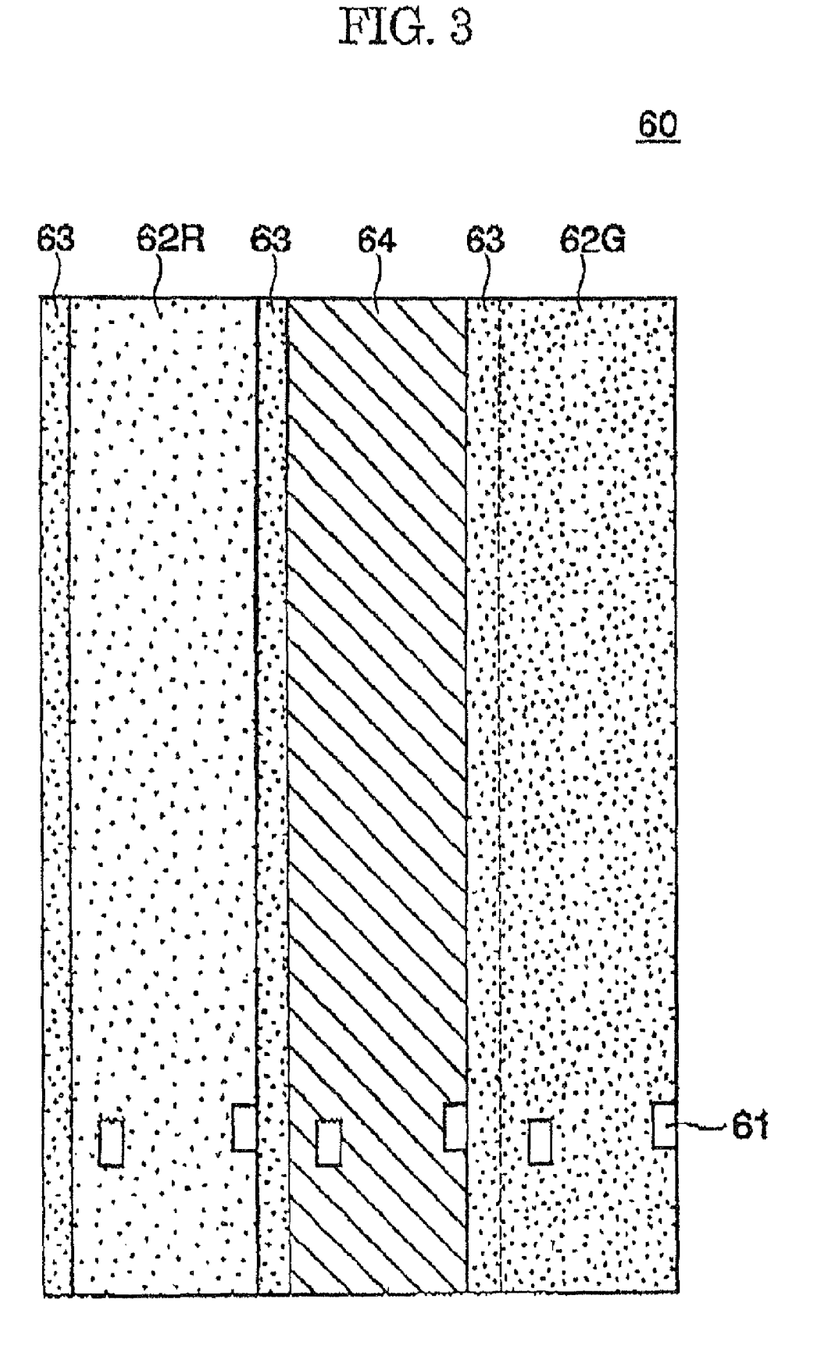
FIG. 3 is a top plan view of a photomask for use in exposure of a photosensitive acrylic resin film in the TFT substrate.

Thereafter, the photosensitive acrylic resin film is exposed to light by using a photomask, and is developed. FIG. 3 shows the photomask used for exposing the photosensitive acrylic resin for the portion corresponding to the pixels shown in FIG. 2. The photomask 60 includes first patterns 61 for exposing the portions of the through-holes 56, 58, second patterns 62R, 62G for exposing the area of the R- and G-pixels 101R, 101G, and third patterns 63 for exposing the light-shield areas 102. The photomask 60 has also light-shield patterns 64 corresponding to the B-pixels 101B.

The first patterns 61 have an optical transmittance of 100%, and the optical transmittances $T_R$, $T_G$ of the second patterns 62R, 62G for the R- and G-pixels are such that $T_R > T_G$. The third patterns 63 have an optical transmittance equal to the optical transmittance of the second patterns 62G for the G-pixels.

In the exposure and development of the photosensitive acrylic resin film, a larger amount of exposure light provides a higher dissolving speed of the resin film with respect to the developing solution. That is, the photomask 60 shown in FIG. 3 provides a larger thickness of the resin film in the area of a higher optical transmittance in the photomask 60, and a smaller thickness in the area of a lower optical transmittance. Thus, the resultant thicknesses $d_R'$, $d_G'$, $d_B'$ of the organic transparent film 14 in the RGB pixels are such that $d_R' < d_G' < d_B'$, and the thickness of the organic transparent film 14 in the light-shield area 102 is equal to the thickness $d_G'$ of the organic transparent film 14 in the G-pixels 101G.

The exposure using the first patterns 61 for the through-holes allows the entire thickness of the photosensitive acrylic resin film to form the through-holes 56, 58 in the resin film. The portion of the photosensitive acrylic resin film corresponding to the area of the seal resin and the outer area is also removed in the entire thickness. A subsequent baking treatment of the photosensitive acrylic resin provides the final structure of the organic transparent film.

In the coating and exposing steps for the photosensitive acrylic resin film, the thickness of the coated film, optical intensity of the exposure, and the optical transmittances of the photomask in the second patterns 62R, 62B are designed so that the final organic transparent film 14 has thicknesses of $d_R'=1.2$ μm, $d_G'=0.5$ μm, $d_B'=2.0$ μm in the RGB pixels. The material for the organic transparent film 14 is not limited to the photosensitive acrylic resin, and may be photosensitive polyimide or other materials having a higher optical transmittance and a suitable photosensitivity.

Subsequently, a dry-etching process is conducted to remove the portion of the passivation film 13 exposed from the bottom of the through-holes 56, 58 to thereby form through-holes 57, 59, which expose therethrough a portion of the drain electrodes and common lines. An ITO (indium-tin-oxide) film is then formed on the organic transparent film 14 while filling the through-holes 56 to 59. The ITO film is then patterned, whereby plugs connected to the drain electrodes and common lines as well as the pixel electrodes 15 and common electrodes 16 formed on top of the plugs are obtained, thereby achieving the structure of the TFT substrate 10.

An orientation film 41 is then formed on the surface of the TFT substrate 10 opposing the color-filter substrate 20, and is subjected to a rubbing treatment along a specific direction. The color-filter substrate 20 is fabricated using a known process, and columnar spacers are formed on the surface of the color-filter substrate 20 opposing the TFT substrate 10. Thereafter, an orientation film 42 is formed on the entire surface including the columnar spacers, and is subjected to a rubbing treatment in a specific direction.

The TFT substrate 10 and color-filter substrate 20 are overlapped together so that a gap defined by the columnar spacers is formed therebetween, with the orientation films 41, 42 being sandwiched between the TFT substrate 10 and the color-filter substrate 20. The periphery of both the substrates 10, 20 is sealed, followed by injecting LC in the gap via an injection port and sealing the injection port.

Polarization films 43, 44 are then bonded onto the light-incident side of the TFT substrate 10 and the light-emitting side of the color-filter substrate 20. The polarization film 43 on the TFT substrate 10 has an optical absorption axis aligned with the direction of the initial orientation of the LC molecules 31, and the polarization axes of both the polarization films 43, 44 are in cross nicole with one another. Driver ICs and signal processing boards area attached onto the LCD device 100 to thereby obtain the final structure of the LCD device 100.

In the process for manufacturing the LCD device 100, exposure of the photosensitive acrylic resin film by using the photomask having optical transmittances $T_R$, $T_G$, $T_B$ for the RGB pixels satisfying the relationship $T_R > T_G > T_B$ provides an organic transparent film having thicknesses $d_R'$, $d_G'$, $d_B'$ satisfying the relationship $d_R' < d_G' < d_B'$ in a simple process.

In an alternative of the above embodiment, another film having thicknesses $d_R'$, $d_G'$, $d_B'$ satisfying the relationship $d_R' < d_G' < d_B'$ may be provided on the overcoat film 24. In this case, the another film should have a larger thickness in order for obtaining a ratio $d_R:d_G:d_B$ among the thicknesses close to the ratio $\lambda_R:\lambda_G:\lambda_B$ among the representative wavelengths. The organic transparent film 14 generally has a largest thickness among the films in the TFT substrate 10. Accordingly, adjustment of the thickness of the organic transparent film 14 is more preferable.

Figure 4:
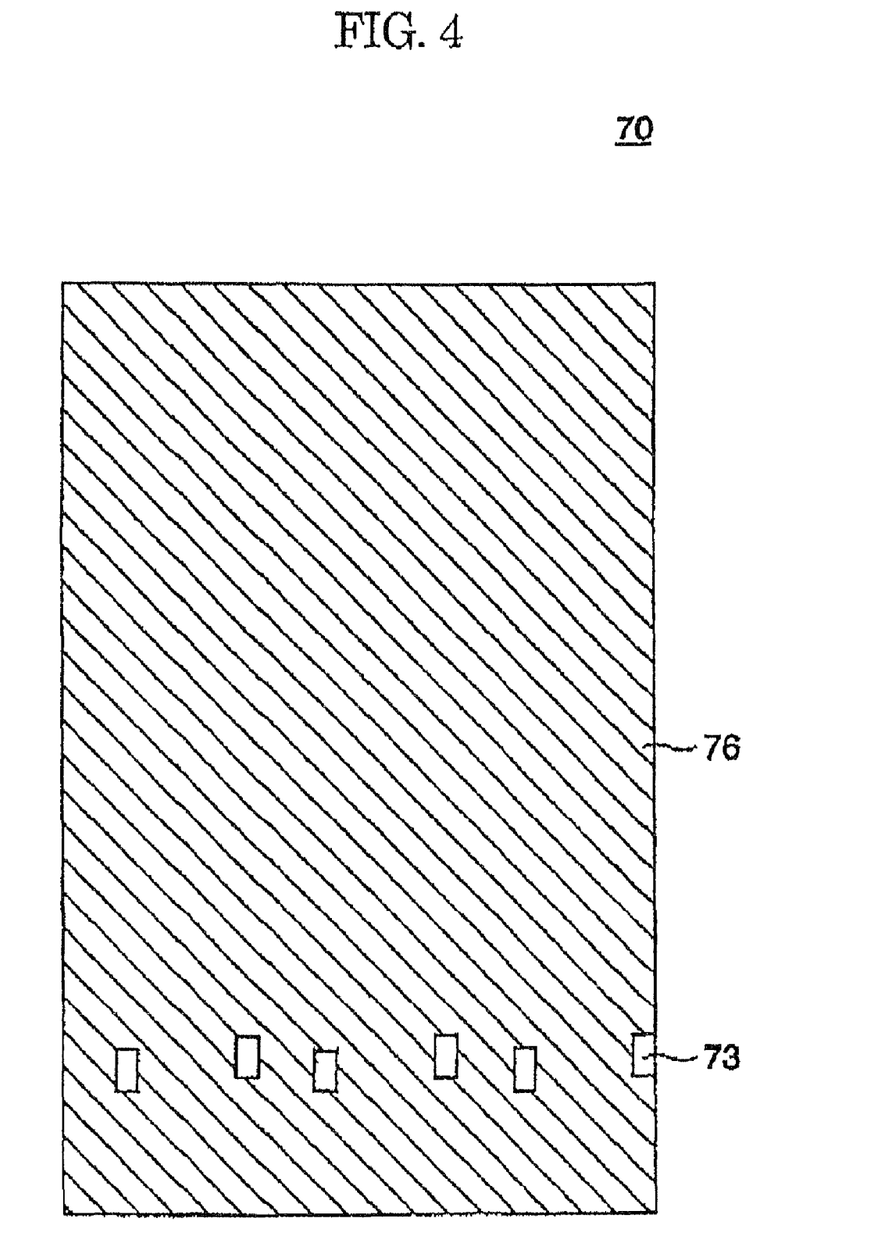
FIG. 4 is a top plan view of another photomask for use in exposure of the photosensitive acrylic resin film in the TFT substrate.
Figure 5:
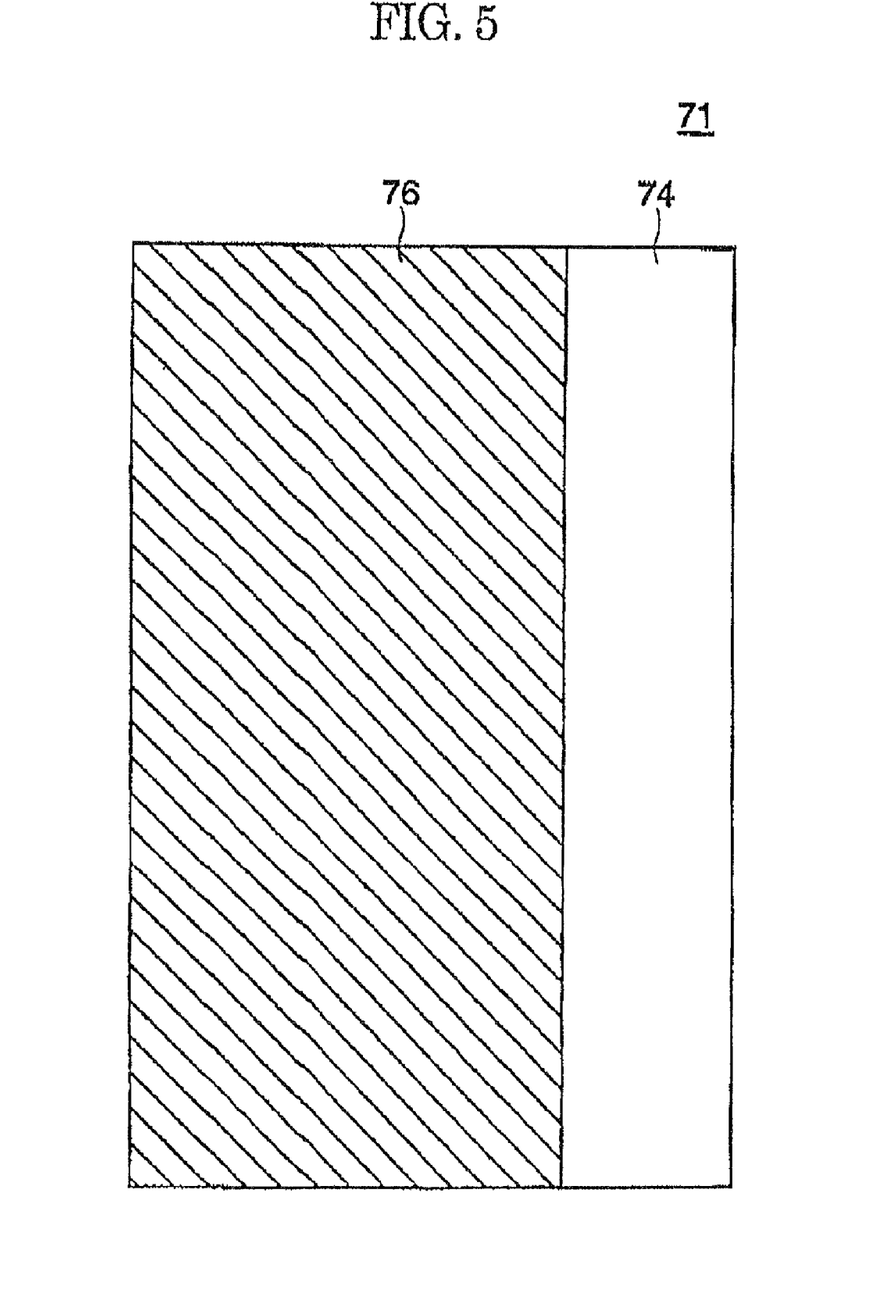
FIG. 5 is a top plan view of another photomask for use in exposure of the photosensitive acrylic resin film in the TFT substrate.
Figure 6:
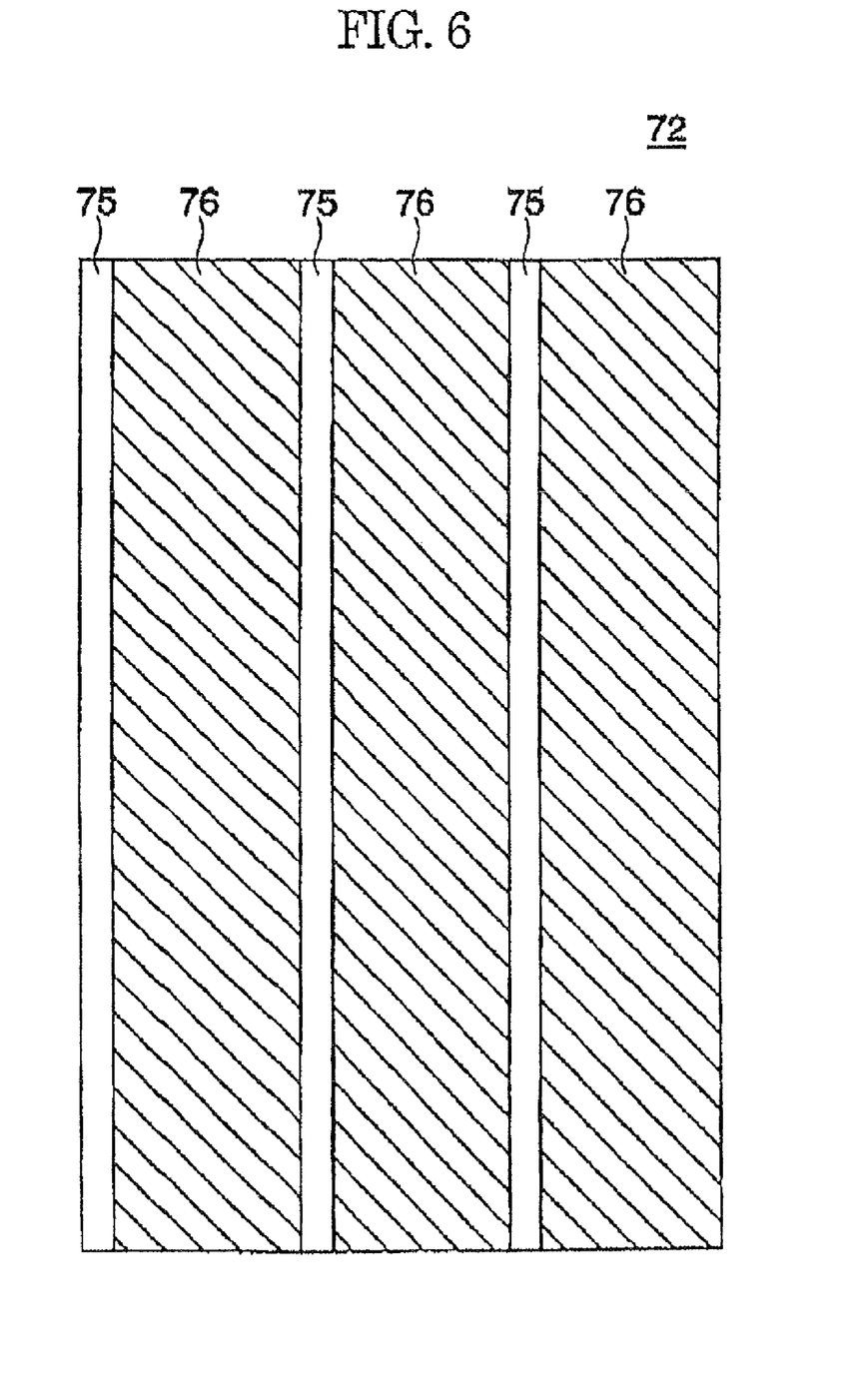
FIG. 6 is a top plan view of another photomask for use in exposure of the photosensitive acrylic resin film in the TFT substrate.

FIGS. 4 to 6 show photomasks used for exposing the photosensitive acrylic resin film in another process for manufacturing the LCD device of FIG. 1. The portion of the photomasks shown in FIGS. 4 to 6 correspond to the area shown in FIG. 2. The photomasks 70 to 72 shown in FIG. 4 to 6 include pattern openings 73 to 75 having an optical transmittance of 100% and formed in a light shield area 76 having an optical transmittance of zero percent.

For exposing the photosensitive acrylic resin film, the photomask 70 shown in FIG. 4 is first used to expose the area of the through-holes 56, 58 penetrating the organic transparent film 14. Subsequently, the photomask 71 shown in FIG. 5 is used to expose the area of the R-pixels 101R and then the area of the G-pixels 101G while moving the TPT substrate with respect to the photomask 71. In this exposure, the area of the R-pixels 101R is exposed to light having a higher optical intensity $I_R$ than the optical intensity $I_G$ of the light to which the area of the G-pixels 101G is exposed. That is, the relationship of the optical intensity is such that $I_R > I_G$. This exposure provides the thicknesses in the organic transparent film such that $d_B > d_G > d_R$.

Subsequently, the photomask 72 shown in FIG. 6 is used for exposing the light-shield area 102. The optical intensity of the light in this exposure is equal to the optical intensity of the light used for exposing the G-pixels 10G. Thus, the organic transparent film 14 in the light-shield area 102 has a thickness equal to the thickness $d_G'$ of the organic transparent film 14 in the G-pixels 101G.

Figure 7:
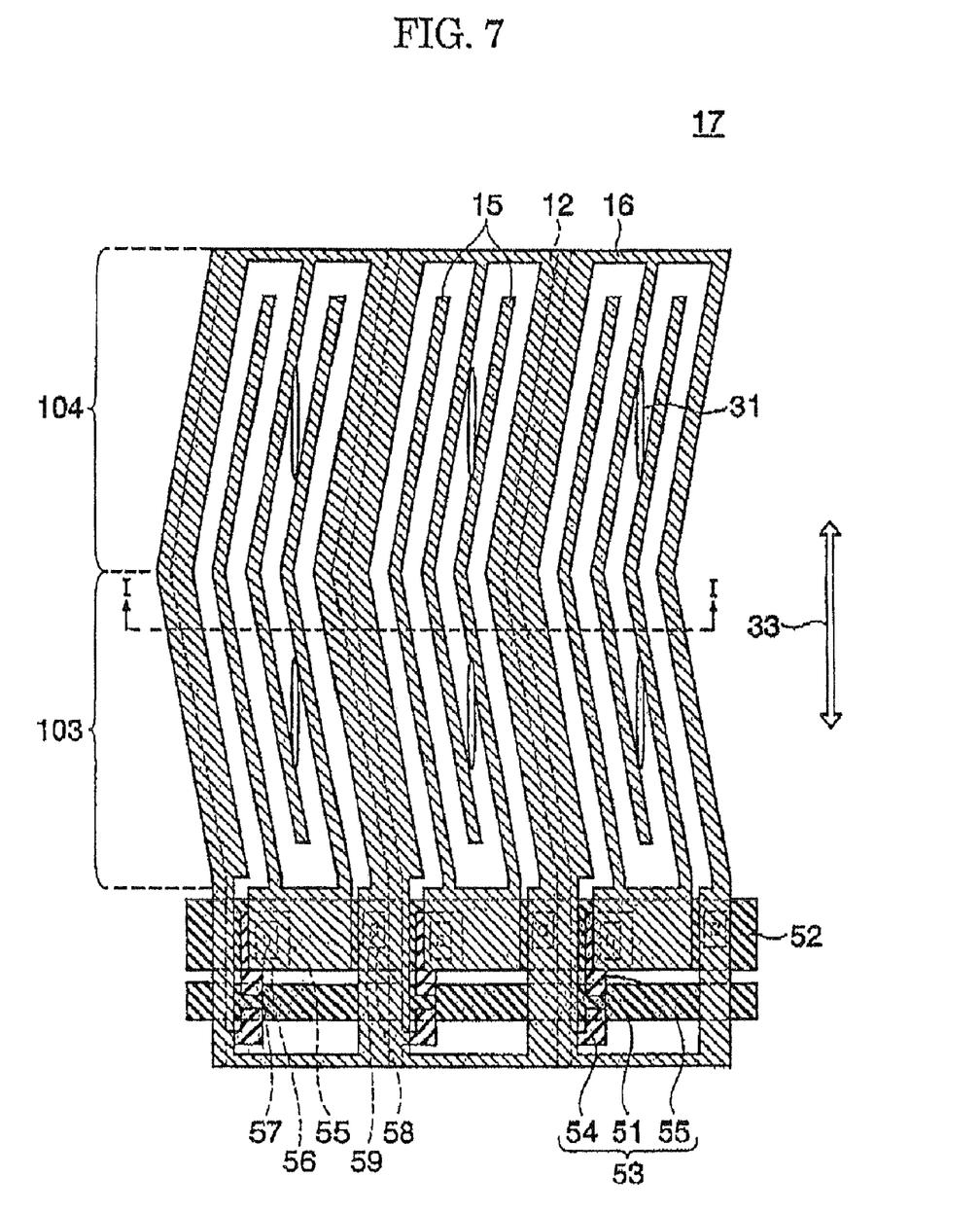
FIG. 7 is a top plan view of a TFT substrate used in a LCD device according to a second embodiment of the present invention.

FIG. 7 shows the TFT substrate in a LCD device according to a second embodiment of the present invention. The TFT substrate 17 includes orientation films 41, 42 having a rubbing direction 33, and a LC layer including LC molecules 31 having an initial orientation normal to the extending direction of the scanning lines 51 and common lines 52. The pixel electrode 15 and common electrode 16 have comb teeth extending in a direction which is slightly deviated from the rubbing direction 33. In addition, the comb teeth have a symmetry with respect to the boundary between the first half area (first sub-pixel area) 103 disposed near the TFT 53 and the second half area (second sub-pixel area) 104 disposed far from the TFT 53.

In the configuration of the LCD device of the second embodiment, upon application of the voltage between the pixel electrode 15 and the common electrode 16, the LC molecules 31 are rotated in opposite rotational directions between the first sub-pixel area 103 and the second sub-pixel area 104. The opposite rotational directions compensate the optical characteristic of the LC layer between the first sub-pixel area 103 and the second sub-pixel area 104, whereby the coloring of the image as observed in a slanted viewing direction can be suppressed upon display of a bright state of the gray-scale level. The LCD device of the present embodiment can be manufactured similarly to the process for forming the LCD device 100 of the first embodiment, except that the planar shape of the pixels 101 and light-shield area 102 in the present embodiment are different from those in the first embodiment.

In the first and second embodiments, the organic transparent film having different thicknesses corresponding to three-primary colors of the pixels provides different thicknesses of the LC layer in the respective pixels having different primary colors, thereby suppressing the coloring of the LC layer without involving complicated design works differently from the conventional technique.

Although it is preferable in the present invention that $d_R:d_G:d_B \approx \lambda_R:\lambda_G:\lambda_B$, a configuration wherein $d_R > d_G > d_B$ may provide the advantage of the present invention. It is preferable that $d_R + d_R' \approx d_G + d_G' \approx d_B + d_B'$ whereby the color filters 23R, 23G, 23B may have a uniform thickness. The three-primary-color system may be other than the red, green and blue color system.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising
 a liquid crystal (LC) layer, and a TFT substrate and a color-filter substrate sandwiching therebetween said LC layer, said LC layer being driven by said TFT substrate in a lateral electric-field mode and defining an array of pixels, said color-filter substrate mounting thereon first through third primary-color filters defining first through third primary colors for respective said pixels;
 a black matrix intermediately disposed between adjacent ones of the respective first through third primary color filters;
 a pixel area defined in an area where light transmitted by said first through third primary color filters is output; and
 a light shield area, defined in an area where the black matrix shields light, said light shield area being disposed between said pixel areas, wherein:
 said first through third primary color filters for respective pixels have substantially the same thickness;
 a transparent film mounted on said TFT substrate within a portion corresponding to said respective pixel area has three different thicknesses corresponding to said first through third primary colors of said pixels;
 a relationship among said three different thicknesses within said portion corresponding to said respective pixel area is such that one of said three different thicknesses corresponding to said first primary color having a longest wavelength is smaller than another of said three different thicknesses corresponding to said second primary color having an intermediate wavelength, and said another of said three different thicknesses is smaller than one other of said three different thicknesses corresponding to said third primary color having a shortest wavelength;
  wherein a part having said one other of said three different thicknesses within said portion corresponding to said respective pixel area is arranged between a part having said one of said three different thicknesses within said portion corresponding to said respective pixel area and a part having said another of said three different thicknesses within said portion corresponding to said respective pixel area, and
  said transparent film mounted on said TFT substrate within a portion corresponding to said light shield area, the portion intermediately disposed between adjacent portions corresponding to said respective pixel areas having ones of said one of said three different thicknesses, said another of said three different thicknesses and said one other of said three different thicknesses has a uniform thickness which is substantially the same thickness as said another of said three different thicknesses; and
 wherein said three different thicknesses are first through third thicknesses $d_r'$, $d_G'$, $d_B'$ corresponding to said first through third primary colors, respectively, of said pixels, and the relationship $d_R' < d_G' < d_B'$ holds, and
 wherein said transparent film has said second thickness $d_{G'}$ in a part that corresponds to said light shield area and that is located between a part having said first thickness $d_{R'}$ and a part having said third thickness $d_{B'}$.

2. The LCD device according to claim 1, wherein said LC layer has first through third thicknesses $d_R$, $d_G$, $d_B$ corresponding to said first through third primary colors, respectively, of said pixels, and the following relationship holds:

$$d_R : d_G : d_B \approx \lambda_R : \lambda_G : \lambda_B,$$

given $\lambda_R$, $\lambda_G$, and $\lambda_B$ representing wavelengths not smaller than 70% of the peak wavelengths in spectra of light passed by said first through third color filters, respectively.

3. The LCD device according to claim 2, wherein the following relationship holds:

$$d_R+d_R' \approx d_G+d_G' \approx d_B+d_B'.$$

4. The LCD device according to claim 3, wherein said transparent film is made of an organic material.

5. The LCD device according to claim 3, wherein a common electrode applying a common potential to said pixels is disposed in such a way as to cover a data line supplying a pixel data signal to a column of said pixels and has a width larger than a width of the data line.

6. The LCD device according to claim 1, wherein each of said pixels includes first and second sub-pixel areas having the same initial orientation direction for LC molecules in said LC layer and said LC molecules rotate in opposite rotational directions between said first sub-pixel area and said second sub-pixel area upon application of a lateral electric field.

7. The LCD device according to claim 1, wherein said three primary colors include red, green and blue colors.

8. The LCD device according to claim 1, wherein said thickness of said TFT substrate within said portion corresponding to said light shield area is the same in whole light shield areas of said TFT substrate.

9. A method for fabricating a liquid crystal display (LCD) device including a liquid crystal (LC) layer, and a TFT substrate and a color-filter substrate sandwiching therebetween said LC layer, said LC layer being driven by said TFT substrate in a lateral-electric-field mode and defining an array of pixels, each defining a respective pixel area of a plurality of pixel areas included within a respective pixel in said array of pixels, said color-filter substrate mounting thereon first through third primary-color filters defining first through third primary colors for a respective one of said pixels in said array of pixels, said primary color filters having substantially the same thickness, said method comprising the steps of:

forming a transparent film having a uniform thickness on said TFT substrate;

exposing said transparent film to exposure light through a mask having different optical transmission factors corresponding to said first through third primary colors of said pixels, thereby establishing a relationship among three different thicknesses within a portion corresponding to said respective pixel area, such that one of said three different thicknesses corresponding to said first primary color having a longest wavelength is smaller than another one of said three different thicknesses corresponding to said second primary color having an intermediate wavelength, and said another one of said three different thicknesses is smaller than one other of said three different thicknesses corresponding to said third primary color having a shortest wavelength;

developing said exposed transparent film to have three different thicknesses, within said portion corresponding to said respective pixel area, corresponding to said first through third primary colors for each respective one of said plurality of defined pixel areas; and forming a black matrix intermediately disposed between adjacent ones of the respective first through third primary color-filters, said black matrix defining a light shield area in an area where the black matrix shields light, said light shield area being disposed between said pixel areas wherein:

said exposed transparent film within a portion corresponding to said light shield area, the portion intermediately disposed between adjacent portions corresponding to said respective pixel areas having ones of said one of said three different thicknesses, said another of said three different thicknesses and said one other of said three different thicknesses has a uniform thickness which is substantially the same thickness as said another of said three different thicknesses, wherein a part having said one other of said three different thicknesses within said portion corresponding to said respective pixel area is arranged between a part having said one of said three different thicknesses within said portion corresponding to said respective pixel area and a part having said another of said three different thicknesses within said portion corresponding to said respective pixel area, wherein each of said pixel areas are defined in an area where light transmitted by said first through third primary color filters is output, wherein said three different thicknesses are first through third thicknesses $d_R'$, $d_G'$ $d_B'$ corresponding to said first through third primary colors, respectively, of said pixels, and the relationship $d_R' < d_G' < d_B'$ holds, and wherein said transparent film has said second thickness $d_G$., in a part that corresponds to said light shield area and that is located between a part having said first thickness $d_R$., and a part having said third thickness $d_B$.

10. A method for fabricating a liquid crystal display (LCD) device including a liquid crystal (LC) layer, and a TFT substrate and a color-filter substrate sandwiching therebetween said LC layer, said LC layer being driven by said TFT substrate in a lateral-electrical-field mode and defining an array of pixels, each defining a respective pixel area of a plurality of pixel areas included within a respective pixel in said array of pixels, said color-filter substrate mounting thereon first through third primary-color filters defining first through third primary colors for each respective one of said pixels, said primary color filters having substantially the same thickness, said method comprising the steps of:

forming a transparent film having a uniform thickness on said TFT substrate;

exposing said transparent film through a mask to exposure light having different optical intensities corresponding to said first through third primary colors of said pixels, thereby establishing a relationship among three different thicknesses within a portion corresponding to said respective pixel area, such that one of said three different thicknesses corresponding to said first primary color having a longest wavelength is smaller than another of said three different thicknesses corresponding to said second primary color having an intermediate wavelength, and said another of said three different thicknesses is smaller than one other of said three different thicknesses corresponding to said third primary color having a shortest wavelength;

developing said exposed transparent film to have three different thicknesses, within said portion corresponding to said respective pixel area, corresponding to said first through third primary colors for each respective one of said plurality of defined pixel areas; and forming a black matrix intermediately disposed between adjacent ones of the respective first through third primary color-filters, said black matrix defining a light shield area in an area where the black matrix shields light, said light shield area being disposed between said pixel areas wherein:

said exposed transparent film within a portion corresponding to said light shield area, the portion intermediately disposed between adjacent portions corresponding to said respective pixel areas having ones of said one of said three different thicknesses, said another of said three different thicknesses and said one other of said three different thicknesses has a uniform thickness which is substantially the same thickness as said another of said three different thicknesses, wherein a part having said one other of said three different thicknesses within said portion corresponding to said respective pixel area is arranged between a part having said one of said three different thicknesses within said portion corresponding to said respective pixel area and a part having said another of said three different thicknesses within said portion corresponding to said respective pixel area, wherein each of said pixel areas are defined in an area where light transmitted by said first through third primary color filters is output, wherein said three different thicknesses are first through third thicknesses $d_R'$, $d_G'$, $d_B'$ corresponding to said first through third primary colors, respectively, of said pixels, and the relationship $d_R' < d_G' < d_B'$ holds, and wherein said transparent film has said second thickness $d_{G'}$, in a part that corresponds to said light shield area and that is located between a part having said first thickness $d_{R'}$, and a part having said third thickness $d_{B'}$.

* * * * *